Aug. 11, 1931. C. M. HOLLEY 1,818,061

AUTOMATIC EXPANSION VALVE FOR ARTIFICIAL REFRIGERATING SYSTEMS

Original Filed Aug. 26, 1918

Inventor
CLARENCE M. HOLLEY

By Charles E. Wiser
Attorney

Patented Aug. 11, 1931

1,818,061

UNITED STATES PATENT OFFICE

CLARENCE M. HOLLEY, OF DETROIT, MICHIGAN, ASSIGNOR, BY MESNE ASSIGNMENTS, TO THE HOOVER COMPANY, OF NORTH CANTON, OHIO, A CORPORATION OF OHIO

AUTOMATIC EXPANSION VALVE FOR ARTIFICIAL REFRIGERATING SYSTEMS

Application filed August 26, 1918, Serial No. 251,583. Renewed August 29, 1924.

This invention relates to expansion valves for use in artificial refrigerating system and its object is to provide an automatic valve for use between the high and low pressure sides of the circulating system adapted to be controlled by the degree of vacuum on the low pressure side. A further object is to provide a valve of the character stated that is adjustable in such manner that the degree of vacuum on the low pressure side may be varied and the refrigerating system operated at the desired temperature. Another object of the invention is to provide a valve whose position relative to its seat is controlled by the contraction and expansion of air within a hermetically sealed chamber, a reduction in pressure exteriorly of the chamber resulting in an excess of pressure within the chamber and actuating a member supporting the valve to unseat it and an increase in pressure exteriorally of the chamber seating the valve. Other features of the invention are involved in the construction of the chambers whereby the pressure exteriorly of sealed chamber may seat or unseat the valve. These several objects and novel features of the invention are hereinafter more fully described and claimed and shown in preferred form in the accompanying drawings in which—

Figure 1:
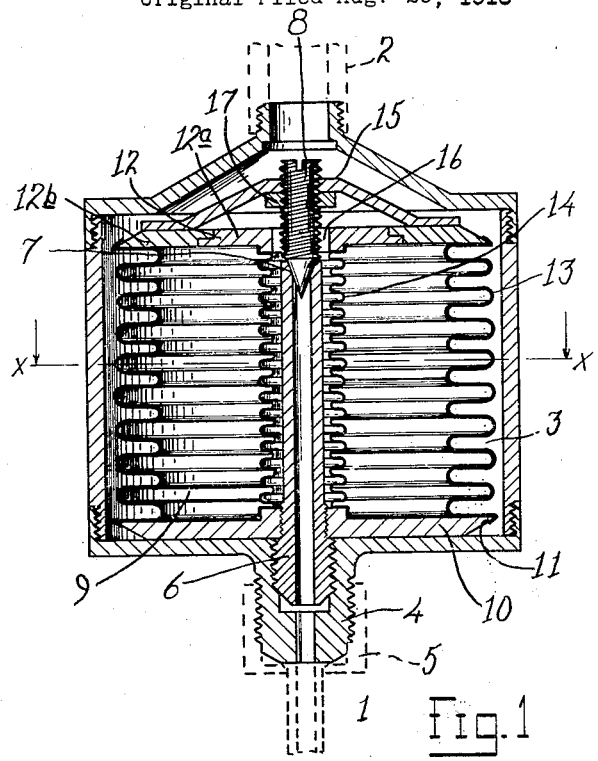
Fig. 1 is a vertical section of a valve embodying my invention.
Figure 2:
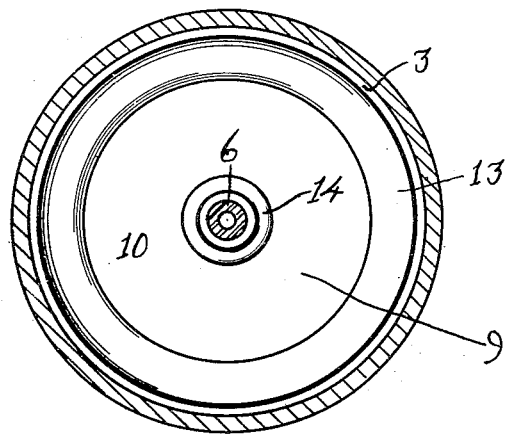
Fig. 2 is a section taken on line x—x of Fig. 1.

The valve is to be used in artificial refrigerator system of any well known type and is to be positioned between the high and low pressure lines of the circulatory system for the refrigerant, the high pressure line and the low pressure line being indicated at 1 and 2 by dotted lines. As is well known but not here illustrated, a pump is utilized on the line 2 to produce a partial vacuum therein and the refrigerant in the circulating system is supplied to the pipe 1 under pressure subsequently to its having been cooled. The device preferably consists of a chamber 3 cylindrical in form and hermetically sealed except for the inlet and outlet pipes 1 and 2 respectively. The pipe 1 may be secured to the lower end of the device which is provided with a conduit 4, threaded to receive a nipple indicated at 5 for securing the pipe 1 thereto. This terminal 4 has an internally threaded recess in which is secured a vertical tubular member 6 extending upward and terminating near the top of the chamber in a seat 7 for a valve member 8. With the valve held on its seat, of course, no fluid may flow through the tube 6, even though it be under pressure as the valve is of comparatively small area and requires only little pressure to maintain it on the seat. The vacuum produced in the pipe line 2 is produced in the chamber 3 which is open thereto, and the feature of this invention is to provide a device for the valve 8 whereby it will be seated or unseated by various degrees of vacuum maintained in the chamber 3.

The control device for performing this function is shown in the drawings. This control device consists of a chamber 9 having circumferentially corrugated, bellows-like, walls allowing it to expand and contract longitudinally. This device is formed of a base member 10 having a threaded central aperture for threading on the tube 6 at about the bottom of the chamber 3 and by such threaded connection the relative relation of member 10 and the bottom wall of the outer casing is readily variable. This member 10 is circular and has a knife like edge indicated at 11. The chamber is also provided with a corresponding member 12 at the upper end having a similar knife like edge. A cylindrical copper member 13 circumferentially corrugated is provided having the ends thereof rolled over the knife like edges of the members 10 and 12 and soldered in place. Within this member 13, is a second bellows member 14 of like construction, but considerably smaller in diameter but sufficiently large to allow the tube 6 to extend thereinto. This member 14 is soldered to central projections provided on the end members 10 and 12 respectively as is indicated, and the chamber 9 is formed between these members 13 and 14 being thus cylindrical in shape and formed of walls of copper or the like, a cross section of which is sinuous in form, enabling the chamber to be elongated or contracted by pressure interiorly or exteriorly.

For the purpose of assembling these corrugated cylinders, the head member 12 is formed of two parts—12a and 12b, soldered together. Prior to soldering the parts together, the inner cylinder 14 is soldered to the projections or hubs on the members 10 and 12. The large cylinder is then placed thereover and the end of the cylinder turned over the edge of the member 10 as indicated at 11 and soldered in place. The member 12b is then placed in position on the part 12a and soldered into the opposite end of the corrugated cylinder which is turned over the knife like edge of the part 12b and soldered. Thus the chamber between the parts 13 and 14 is sealed hermetically. The composite end member 12 has secured thereto a bar 15, centrally apertured in alignment with the central aperture 16 in the member 12 which opens to the interior of the corrugated cylinder 14. The aperture in the bar 15 is threaded to receive the threaded stem of the valve 8, and a lock nut 17 is provided to prevent accidental displacement of the valve.

It will be readily understood that, by screwing the valve stem through the bar 15 on to the seat in the tube 6, the corrugated cylinder will be expanded to greater or less extent depending upon the extent to which the stem is turned. This seats the valve with a certain pressure due to the natural tendency of the corrugated cylinder to contract and thus maintains the conduit 6 closed to flow of refrigerant fluid therethrough.

The chamber 9 is sealed with air therein at normal pressure. If the pressure in the chamber 3, exteriorly of the corrugated cylinder is reduced the air within the chamber 9 expands and by reason of securing the end member 10 in fixed position in the chamber the excess of pressure within the chamber 9 tends to move the head 12. This opens the valve and the valve will remain open and allow flow from the high pressure line until the difference in pressure between the chambers 9 and 3 is not sufficiently great to overcome the tension with which the valve is seated. Bearing in mind that the cylinder has somewhat expanded, due to setting of the valve, it is evident that the reduction in pressure must be sufficiently great to produce an excess pressure in the chamber 9 to overcome the tension with which the valve is fitted before the said valve will open. In other words, if the valve be seated and the cylinders 13 and 14 elongated to such an extent that the valve is set with a pressure of five pounds per square inch, then the atmosphere within the chamber 9 is not at normal atmospheric pressure but is somewhat below that, due to the increase in volume of the chamber 9. Under this condition a vacuum may be produced in the chamber 3 to the extent of five pounds below normal without disturbing the seating of the valve 8. If the pump on the line 2 reduces the pressure in the chamber to say six pounds below normal, then the valve opens and allows a flow of fluid through the tube 6 which increases the pressure in the chamber 3 and causes the valve 8 to close.

It is thus evident that by use of this device a balance is maintained between a substantially atmospheric pressure in the chamber 9 and the degree of reduction in pressure in the chamber 3, the valve opening when the pressure in the chamber 3 is reduced beyond the extent predetermined by the valve setting and closing if the pressure approaches that predetermined by the valve. It is to be understood, however, as not being literally true that a pressure of five pounds on the valve will be exactly balanced by a reduction of five pounds below normal in the chamber 3 inasmuch as the parts have some inertia and weight. Aside from this, however, the stated mode of action is correct.

After once setting the device it is in automatic operation and will control the degree of vacuum within the desired limitations and without material difference in operation whatever the temperature of the interior atmosphere may be. It is, therefore, practically unaffected by variations in temperature of the room in which device is located. This is a desirable feature, particularly in all household artificial refrigerating outfits which are placed in a great variety of places, adjacent heating plants or remote therefrom. It is further evident that the device is simple in construction and efficient in operation and that the device may be set to operate at a certain degree of vacuum in the low pressure line productive of the desired cooling effect.

Having thus briefly described my invention what I claim is—

1. An expansion valve for use between high and low pressure lines of refrigerating systems, comprising a cylindrical chamber open to the low pressure line, said high pressure line including a tubular member extending into the said chamber, a hermetically sealed cylindrical chamber comprising a head adapted to be secured to the said extension at the bottom of the cylindrical chamber and a corresponding head at the opposite end, the said heads being connected at the periphery by a circumferentially corrugated cylinder of thin sheet metal and said heads being further connected centrally by a similar corrugated cylinder of comparatively small diameter through which the said tubular member extends, the said corrugated walls being secured to the heads to hermetically seal the chamber therebetween, the said upper head being apertured to open the interior of the inner corrugated cylinder to the outer chamber, a valve supported by said head and extending through the aperture, and an end of the tubular member having a seat for the valve and the valve being adjustable in its support whereby the valve may be seated to cause a decrease in pressure within the hermetically sealed chamber and determine the extent of decrease in pressure required in the first mentioned outer inclosing chamber to enable the pressure within the sealed chamber to elongate the same to unseat the valve.

2. In a refrigerating apparatus of the described character, the combination of a valve chamber having communication with the refrigerant circulatory system, a valve controlling such communication, and a gas filled hermetically sealed collapsible chamber arranged within the valve chamber and operatively and rigidly connected with the valve and adapted to actuate same.

3. In a refrigerating apparatus of the described character, the combination of a valve chamber having communication with the refrigerant circulatory system, a valve controlling such communication, and a collapsible hermetically sealed chamber filled with air at substantially atmospheric pressure and arranged within the valve chamber, said collapsible chamber being operatively and rigidly connected with the valve and adapted to actuate same.

4. In a refrigerating apparatus of the described character, the combination of a valve chamber having communication with the refrigerant circulatory system, a valve controlling such communication, and a gas filled hermetically sealed collapsible chamber arranged within the valve chamber and operatively and rigidly connected with the valve and adapted to actuate the same, said collapsible chamber having walls of bellows form.

5. In a refrigerating apparatus of the described character, the combination with a valve chamber provided with passages adapted to have operative connection with the refrigerant circulatory system, a valve, a valve seat for the valve within said chamber, a hermetically sealed collapsible chamber within said valve chamber, said collapsible chamber being filled with air at substantially atmospheric pressure, and operative rigid connections between one of the walls of said collapsible chamber and said valve for operating the latter in relation to its seat.

6. In a refrigerating apparatus of the described character, the combination with a valve chamber provided with passages adapted to have operative connection with the refrigerant circulatory system, a valve, a valve seat for the valve within said chamber, a hermetically sealed collapsible chamber within said valve chamber, being filled with a cushioning and expansible gas, and operative rigid connections between the walls of said collapsible chamber and said valve for operating the latter, said collapsible chamber operating independently of pressures external to the said refrigerant circulatory system.

7. In a refrigerating apparatus of the described character, the combination with a valve chamber provided with passages adapted to have operative connection with the refrigerant circulatory system, a valve, a valve seat for the valve within said chamber, means within said valve chamber and hermetically sealed and rigidly connected for actuating said valve, said means being responsive to pressure conditions within said chamber and operating independently of pressure conditions external to the said refrigerant circulatory system.

8. In a refrigerating apparatus of the character described, the combination with a valve chamber provided with passages adapted to have operative connection with the refrigerant circulatory system, a valve, a valve seat for the valve within the chamber, a collapsible gas filled chamber within said valve chamber and a rigid end wall having connection with the valve for operating same, and an end wall adjustably secured to one of the walls of said valve chamber.

9. An expansion valve for use between high and low pressure lines of a refrigerating system, comprising a main casing forming a chamber open to the low pressure line, said high pressure line discharging thereinto, a hermetically sealed casing comprising non-flexible heads connected by an outer elastic shell and an inner elastic shell, a valve carried by one of said non-flexible heads and arranged to cooperate with said high pressure line for opening and closing thereof, and means for adjustably connecting the other of said non-flexible heads to said main casing, said adjustable connecting means serving as a regulator to time the opening or closing of said valve in response to pressure conditions within said main casing.

10. In a pressure controlling device comprising a main casing, a low pressure outlet, and a high pressure inlet formed of a tube extending into said main casing, a hermetically sealed collapsible casing surrounding said inlet tube, and adjustably fixed relative thereto and near the base thereof, and a valve carried by said collapsible casing and arranged to cooperate with said inlet tube to regulate the inflow from the high pressure line.

In testimony whereof, I sign this specification.

CLARENCE M. HOLLEY.